(12) United States Patent
Penterman et al.

(10) Patent No.: US 6,764,614 B2
(45) Date of Patent: Jul. 20, 2004

(54) STRATIFIED PHASE-SEPARATED COMPOSITE HAVING CROSS-LINKED POLYMERIC LAYER

(75) Inventors: Roel Penterman, Eindhoven (NL); Stephen Isadore Klink, Eindhoven (NL); Dirk Jan Broer, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/203,575

(22) PCT Filed: Dec. 12, 2001

(86) PCT No.: PCT/IB01/02512
§ 371 (c)(1),
(2), (4) Date: Aug. 9, 2002

(87) PCT Pub. No.: WO02/48282

PCT Pub. Date: Jun. 20, 2002

(65) Prior Publication Data

US 2003/0022002 A1 Jan. 30, 2003

(30) Foreign Application Priority Data

Dec. 14, 2000 (EP) .............................................. 00204529
Apr. 17, 2001 (EP) .............................................. 01201395
Oct. 25, 2001 (EP) .............................................. 01204081

(51) Int. Cl.[7] .............................................. C09K 19/00
(52) U.S. Cl. ................. 252/299.01; 349/167; 349/183; 349/187
(58) Field of Search ................. 349/167, 168, 349/169, 183, 184, 187; 428/1.1; 252/297.1–297.7

(56) References Cited

U.S. PATENT DOCUMENTS

| | | | | |
|---|---|---|---|---|
| 5,403,510 A | * | 4/1995 | Kajiyama et al. | 252/299.01 |
| 5,437,811 A | * | 8/1995 | Doane et al. | 252/299.01 |
| 5,523,127 A | * | 6/1996 | Ohnishi et al. | 428/1 |
| 5,679,414 A | * | 10/1997 | Akashi et al. | 428/1 |
| 5,858,268 A | * | 1/1999 | Niiyama et al. | 252/299.01 |
| 5,945,203 A | * | 8/1999 | Soane | 428/209 |
| 5,949,508 A | | 9/1999 | Kumar et al. | 349/122 |
| 5,951,912 A | * | 9/1999 | Mercer | 252/299.01 |

FOREIGN PATENT DOCUMENTS

| | | | | |
|---|---|---|---|---|
| EP | 0 632 312 A2 | * | 6/1994 | G02F/1/1339 |
| JP | 06-273726 | * | 9/1994 | G02F/1/1333 |
| JP | 09-101508 | * | 4/1997 | G02F/1/1333 |

OTHER PUBLICATIONS

Translation of Japanese Publication Nos. 06–273726 and 09–10108.*
Vorflusev et al: "Phase–Separated Composite Films for Liquid Crystal Displays," Science vol. 283, Mar. 19, 1999, pp. 1903–1905.

* cited by examiner

Primary Examiner—Mark F. Huff
Assistant Examiner—Jennifer R. Sadula

(57) ABSTRACT

A stratified-phase-separated composite comprises a liquid layer, such as a liquid crystal layer, and a polymeric layer. In order to obtain a more complete stratification resulting in less liquid being present in the polymeric layer, the polymeric layer is crosslinked. The stratified composite is preferably obtained by photo-polymerization induced phase-separation of a phase-separable composition provided on a single substrate or dispersed between two opposite substrates.

6 Claims, 1 Drawing Sheet

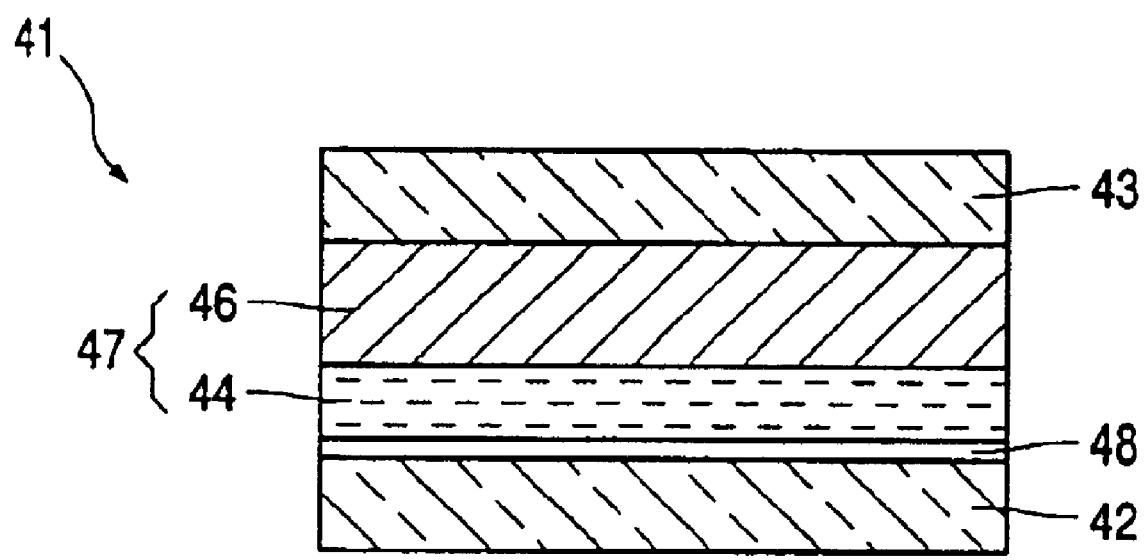

STRATIFIED PHASE-SEPARATED COMPOSITE HAVING CROSS-LINKED POLYMERIC LAYER

The invention relates to a stratified phase-separated composite and a method of manufacturing such a composite.

In Science vol.283 (1999) page 1903, Kumar et al. (see also U.S. Pat. No. 5,949, 508) disclose a phase-separated composite and a method of manufacturing such. The known composite is manufactured by providing, between a pair of opposed substrates, a layer of a photo-polymerizable prepolymer dissolved in an organic liquid, in particular a liquid crystal. The organic liquid and monomer are selected such that the liquid is poorly miscible with the photo-polymerized monomer. If so selected, phase-separation of the liquid and the photo-polymer takes place during photo-polymerization, a process known in the art as polymerization-induced phase separation (PIPS). In the composite of Kumar et al. the organic liquid is furthermore adapted to absorb the UV light used for photo-polymerizing the monomer. Therefore, according to Kumar et al, upon subjecting the layer to UV light, a light intensity gradient is set up in the layer in directions normal to the layer, the highest intensity occurring at the side layer facing the UV light source. Since the rate at which photo-polymerization takes place scales with the intensity of UV light, photo-polymerization and therefore phase-separation preferentially takes place at the side of the layer facing the light source. As a result the phase-separation takes place in a stratified manner, producing a composite comprising a predominantly polymeric layer formed at the UV light source side and a predominantly liquid layer at the side facing away from the UV light source.

A disadvantage of the known composite is that the stratification is not complete. In particular, the polymeric layer comprises small amounts of liquid crystal material. For many applications such inclusions of LC material may be undesirable. For example, the liquid crystal present in the polymeric layer may give rise to spurious switching effects and/or during the useful lifetime of the composite liquid crystal material may migrate to and merge with the liquid layer so as to affect the properties of the liquid crystal layer, such as its retardation or orientation.

It is an object of the invention, inter alia, to provide a stratified phase-separated composite which does not have these drawbacks or at least to a lesser extent. In particular, it is an object to provide a stratified-phase-separated composite which is well-stratified. In particular, the number of liquid molecules present in the polymeric layer (regardless the form in which such liquid molecules are present, ie dispersed as droplets or dissolved on a molecular scale) is to be low.

In accordance with the invention, these objectives are achieved by a stratified phase-separated composite comprising a crosslinked polymeric layer and a liquid layer, the composite being obtainable by crosslinking a layer of a crosslinkable, stratified-phase-separable composition comprising a crosslinkable material and a liquid.

The stratified-phase-separated composite in accordance with the invention has a separate liquid layer and a chemically crosslinked polymeric layer. In contrast to polymer dispersed liquid crystals the liquid layer is a continuous layer. The composite in accordance with the invention is well stratified in that only a small number of liquid crystal molecules is present in the crosslinked polymeric layer indicating that the phase-separation is more complete. Upon crosslinking of the crosslinkable composition, phase-separation occurs in a stratified manner to produce a layer of a crosslinked polymer and a layer of liquid. A crosslinked polymer, in the art also referred to as a network polymer, has a polymer network extending in three dimensions, the network structure rendering the polymer relatively rigid compared to corresponding linear chain polymers.

Although not wishing to be bound by any theory, it is believed that, compared to linear chain polymers, crosslinked polymers are particularly effective in squeezing out liquid molecules from the polymeric layer being formed. Specifically, in the early stages of the stratification process it is observed that a polymeric layer is formed which extends almost across the entire layer of stratified-phase-separable material. In the early stages this polymeric layer has no to very few crosslinks and is swollen with liquid molecules. Upon further crosslinking, the number of crosslinks increases, the polymer network becomes more dense and, as a result, the polymeric layer contracts, its thickness becoming smaller, thus squeezing out the liquid molecules. As a result, the crosslinked polymeric layer contains less liquid material and the stratified phase-separation is more complete compared to a polymeric layer made of a linear polymer.

Further advantages of crosslinked polymers are improved temperature and mechanical resistance and resistance to chemicals such as solvents, the latter being convenient if the polymeric layer is to serve as a substrate for wet deposition of further layers. Moreover, being crosslinked, the polymer has a high strength and may, if used to support further layers or to serve as a substrate, be applied in thinner layers and still provide adequate support.

The composite is obtainable by stratification of a single homogenous layer. The stratification is by means of phase-separation. In the present invention, phase-separation is induced by crosslinking. Other methods of phase-separation are known in the art and, in order to optimize the extent of phase-separation, crosslinking is used in combination with such other method, such other method being, for example, solvent-induced phase-separation or thermally-induced phase-separation. Dynamically stabilized or metastable mixtures of non-miscible liquid and crosslinkable material may also be used to induce phase-separation. Preferred however is to use crosslinking in combination with polymerization-induced phase-separation (PIPS). PIPS may thermally initiated or photo-initiated. Preferred is photo-initiated, that is photo-polymerization-induced phase-separation.

Stratification, that is phase-separation in a stratified manner, may be brought about in various ways.

Stratification may be achieved by making use of differences in surface tension in particular differences in wetting. The composite is then obtained by supplying the stratified-phase-separable composition on a substrate, the liquid having a spreading contact angle on the substrate and the liquid being capable of wetting the substrate significantly better than the crosslinkable material being polymerized. When phase-separation is induced by means of crosslinking, optionally in combination with other phase-separation means described hereinabove, it is energetically favorable for the liquid to spread on the substrate and push crosslinkable material (being polymerized) adjacent the substrate away from the substrate thus forming a liquid layer directly adjacent to that substrate and a polymeric layer on the other side.

Differential wetting may be employed using a single substrate but may be used and even more effectively so if the composition is provided between two substrates.

Differences in wettability can be achieved by subjecting the substrate surface(s) to a wetting treatment such as plasma or UV ozone treatment or apply a wetting layer or mix the stratified-phase-separable material with a wetting agent. Such layers, agents and treatments are all well known in the art.

An alternative method of stratification, one which may be applied independent of differential wetting but preferable is applied in conjunction with differential wetting comprises applying a crosslinkable, stratified-phase-separable composition which is photo-polymerizable and which has absorbing means to set up a light intensity gradient with respect to the light being used to photo-polymerize. The composition may be rendered absorbing by using an absorbing liquid or an absorbing photo-crosslinkable monomer or by adding a separate photo-polymerization dye.

For further details regarding the use of photo-polymerization to obtain stratified-phase-separated composites, in particular details relating to dyes suitable for this purpose, such as a dye which selectively accumulates in the polymeric layer or a photo-reactive dye which during photo-polymerization becomes chemically linked to the monomer being polymerized or a dye which is co-polymerizable with the (photo-crosslinkable) monomer, reference is made to a companion patent application, viz. an international application entitled "Stratified phase-separated composite comprising a photo-polymerization dye" filed on the same day by Applicant (Applicant's reference PHNL010919) claiming priority of, inter alia, an European patent application having application number 00204529.2.

The crosslinked polymer is obtained by crosslinking a composition comprising a crosslinkable material. By definition, the crosslinkable material is capable of forming a crosslinked polymer.

The crosslinkable material may be a (linear) crosslinkable polymer, crosslinkable using high-energy actinic radiation such as e-beam or crosslinkable using a crosslinking agent such as the vulcanization of rubber using sulfur. The high-energy abstracts hydrogen atoms from the polymer chains, creating radicals on the polymer chains, which radical may then combine to form covalent bonds, each such covalent bond creating a crosslink of one single covalent bond.

In order to obtain stratified-phase-separable compositions which have good film forming properties and have a viscosity suitable for effective, it is preferred that the crosslinkable material is a crosslinkable monomer or a crosslinkable monomer composition. The monomer is generally a low molecular weight compound or in particular a prepolymer. A monomer or compound is crosslinkable (also referred to as a crosslinker or crosslinking agent) if it has a functionality of larger than 2, meaning that it is capable of reacting with more than 2 other molecules. Typically, crosslinks are formed by means of covalent bonds but H-bridges may also be used to form crosslinks, H-bridged and covalent crosslinks collectively being referred to as chemical crosslinks. In crosslinkable monomer compositions, preferably, the crosslinkable compound is a crosslinkable monomer or is combined with a monomer, where monomer means a compound functionalized with a polymerizable group.

Suitable polymerizable monomers include monomers for performing a polycondensation, such as monomers for obtaining a polyether, a polyester or a polyamide, monomer for performing a cycloaddition reaction, a ring opening reaction, a polyaddition, a chain polymerization or a step polymerization. Preferred are monomers for free-radical chain polymerization.

Examples of preferred monomers, in particular for polymerization-induced phase-separation, include a thiol-ene system or monomer, an oxetane, an epoxide, a vinylene, a vinylether, an acrylate, a methacrylate or a cinnamate monomer. With the exception of the cinnamate group which has a functionality of 1, the polymerizable group of these preferred monomers have a functionality of 2 meaning that monomers having one polymerizable group, that is mono-(meth)acrylates, mono-epoxides, mono-vinylethers, mono-oxetane, mono-vinylenes, and thiol-ene monomers, suffice to form a linear polymer. To obtain crosslinked polymers, monomers comprising two or more polymerizable groups each having a functionality of at least 2 may be used, such as di(meth)acrylates, di-vinlyethers, di-oxetanes, di-vinylenes, di-epoxides, or thiol-ene systems comprising trithiols or di-enes or di-enes provided with a mercapto group or ene-functionalized dithiols or higher homologues of such monomers, all of which are known in the art per se. Crosslinked cinnamates require monomers carrying at least three cinnamate groups. Particularly preferred are combinations of monomers having one polymerizable group and monomers having two or more polymerizable groups as they allow the degree of cross-linking to be freely selected. Hydrolytically condensible organo-metallic compounds such silicon alkoxides may also be used to obtain crosslinked polymers.

The stratified-phase-separable material may comprise just one type of monomer to produce a homopolymer but generally it will contain more than one type to obtain copolymers, the term copolymers including terpolymers or higher homologues. The monomer may itself be a polymer, also referred to as a prepolymer, which is further polymerized and/or crosslinked to obtain the crosslinked polymer. Different non-co-polymerizable monomers may also be used to obtain a polymer blend which may or may not be phase-separated.

Combinations of liquid crystal and monomers which may be suitable candidates for use in the stratified-phase-separable compositions in accordance with the invention are those used to manufacture polymer dispersed liquid crystals.

The stratification, in particular the amount of liquid being trapped in the crosslinked polymeric layer, will depend on the degree of crosslinking. Generally, if the degree of crosslinking is very low the polymer will substantially behave as a linear polymer and the stratification process will be improved to a small extent only. On the other hand, if the degree of crosslinking is very high the polymer network is formed very quickly, leaving very little time for the liquid to migrate to the liquid layer being formed. This will lead to liquid being trapped in the polymeric layer. It will also be understood by those skilled in the art that the required degree of crosslinking to obtain optimal stratification depends of the particular combination of liquid and crosslinkable material used and the rate at which the stratification is carried out.

In the context of the present invention, the degree of crosslinking is defined in terms of the crosslink density, crosslink density being expressed as the number of crosslinks in moles per 1000 g of polymer.

In case of a stratified-phase-separated composite comprising a crosslinked polymer obtained by subjecting a linear polymer to high-energy radiation, such as e-beam, to abstract hydrogen atoms thus forming radicals on the linear polymer chains, which radicals then react with each other to form a single covalent bond, the single covalent bond being the crosslink, the crosslink density is, preferably, at least about 0.1 to 0.5 and at most about 10, or, better, 5, or preferably 2.5. If the crosslink density is higher than the maximum, the improvement in stratification is relatively small whereas the time to manufacture the composite as well as the radiation dose continues to increase, thus increasing the risk of damage being done to the composite or the substrate on which is manufactured by the high-energy radiation. If the crosslink density is below the lower limit, improvement of stratification is impaired.

In case of a stratified-phase-separated composite obtained from a stratified-phase-separable composition wherein the crosslinkable material is a crosslinkable monomer or a crosslinkable monomer composition, the crosslink density of the polymer may be calculated using the functionality of the monomers. Specifically, a crosslinker molecule having functionality f contributes f-2 crosslinks. Assuming all crosslinkers fully react to form the crosslinked polymer, the crosslink density is calculated as $1000*\Sigma_i x_i/M_i*(f_i-2)$, where $x_i$ is the weight fraction of crosslinker i relative to the total monomer weight in the stratified-phase-separable composition ($\Sigma_i x_i=1$), $M_i$ is the molar mass of crosslinker i and $f_i$ is the functionality of crosslinker i.

Generally, the crosslink density will be between about 0.1 to about 10 moles crosslinks per 1000 g of polymer. Preferably, however the lower limit is about 0.15, or better about 0.25. In selected cases, the upper limit is preferably about 6.0 or even better about 2.5. In a preferred embodiment, the crosslink density is in the range from 0.15 to 2.5.

If the crosslink density is below the lower limit, improvements in stratification may be insufficient, whereas if the upper limit is exceeded the network formation may proceed too rapid, leading to substantial amounts of liquid being trapped in the crosslinked layer. Moreover, if the degree of crosslinking is high it is difficult to obtain a full conversion of the polymerizable groups.

If the crosslinkable composition contains a combination of monomers which are as such not crosslinkable and crosslinkable monomers, it may be useful to express the degree of crosslinking as the mole fraction of crosslinkable monomer of the total monomer amount. Generally, the molar fraction may vary from 0.01 to 0.99. Typically, however the molar fraction is 0.75 or less, or more specific, 0.50 or less, or even 0.25 or less.

In the art, different methods to crosslink in casu polymerize a crosslinkable monomer or monomer composition are known. In a first method, crosslinking is induced by heating the crosslinkable composition, in the art also known as thermosetting where heating is performed by conventional means such as exposure to infrared (IR) radiation. Alternative to or in combination with heating, crosslinking may be induced by actinic radiation, in the art also known as photosetting, photo-polymerization or photo-crosslinking. In both cases crosslinking may be facilitated by an initiator, such initiators being known per se. In case crosslinking involves free radical polymerization, the initiator is a compound which upon applying heat or radiation produces free radicals. Actinic radiation includes e-beam radiation, gamma radiation and electromagnetic radiation such as X-rays, visible light and UV light.

There is no limit on the type of liquid which may be used for the composite in accordance with the invention other than it should be able to form a liquid layer by means of stratified phase-separation. Examples include inorganic liquids, such as water or water-based liquids, and organic liquids.

In a particularly suitable embodiment, the liquid is a liquid crystal.

Suitable liquid crystals include those capable of forming a planar, a homeotropic, a twisted or splay orientation. The orientation can also be uniaxial or biaxial. Any LC phase may be suitably used, such as nematic, twisted nematic, cholesteric, discotic, smectic A and C, ferroelectric, flexo-electric and the like. The liquid crystal layer may be partitioned into a number of distinct domains, such as sub-pixel domains, each domain having a different anisotropic orientation. In particular, the difference in orientation may be limited to a difference in the orientation of the director(s) while the LC phase is the same.

The liquid may also be a polymerizable or polymerized liquid. The latter, being a solid, is of particular advantage in applications where the fluid nature of the liquid is of no relevance for the function to be achieved.

The thickness of the liquid layer will depend on the particular application sought but generally will vary from about 0.1 $\mu$m to about 1 mm. In case the liquid layer is a liquid crystal layer the thickness will typically be 0.5 $\mu$m to 10 $\mu$m or more particular, 1 $\mu$m to 6 $\mu$m. The thickness of the polymeric layer will depend on its function in the composite. If the polymeric layer as such does not have to provide the necessary protection and/or ruggedness, resistance to tear and other mechanical forces, but has to be capable of providing a substrate surface for the provision of subsequent layers such as layers which do provide the necessary ruggedness and/or mechanical integrity the polymeric layer can be relatively thin, that is at least about 0.1 to 0.2 $\mu$m and at most about 5 to 10 $\mu$m. On the other hand, if the polymeric layer is to provide a significant contribution to the mechanical integrity of the composite, a thicker polymeric layer is preferable, typically larger than 5 $\mu$m. Since the time required to phase-separate increases as the combined thickness of liquid layer and polymeric layer increases it is generally desirable to keep the combined thickness as low as possible. Typically, the combined thickness would be less than 100 μm or more particular less than 50 μm.

The specific relative amounts of liquid and polymerizable material in a stratified-phase-separable composition in accordance with the invention will depend on the desired ratio of liquid to polymeric layer thickness but generally will be between about 1 and 99 percent by weight. Phase-separation is more easily facilitated if the relative amount of liquid or monomer ranges between 5 and 90 wt % or better between 10 and 80 wt %. The relative amount of photo-polymerization dye, if present and added as a separate component, is determined by the desired light intensity gradient. Typically, the amount will be less than 20 wt % or even less than 10 wt % of the total weight of the stratified-phase-separable composition.

A substrate may be used to confine the liquid layer during use of the composite and/or to provide a surface on which a layer of phase-separable material may be provided. Suitable substrates include glass and plastic but also metal mirror coated or silicon substrates optionally comprising integrated circuits manufactured using CMOS technology. If the composite is used for a transmissive optical application the single substrate is to be transparent. The composite in accordance with the invention may in particular be combined with a flexible substrate, such as a foldable substrate. In order to facilitate roll to roll manufacturing of the composite a wrappable substrate may be used. Suitable materials for flexible, foldable and/or wrappable single substrates include polymer films and sheets, metal foils and coated paper or laminates thereof.

In a particular embodiment, the stratified-phase-separated composite comprises a liquid layer dispersed between a first and second polymeric layer, the composite being obtained by photo-crosslinking a stratified-phase-separated composition. Such a composite may be manufactured by irradiating a layer of photo-polymerizable stratified-phase-separable material having a photo-polymerization dye from both sides such a light intensity gradient is set up which has a minimum light intensity in the middle and which increases towards the outer surfaces. Such irradiation requires the use of a substrate transparent for the radiation used.

In case the liquid layer is a liquid crystal layer which is to be anisotropically oriented it is convenient—as is well known in the art—to provide the substrate with an alignment layer or provide the substrate surface with some other alignment inducing means. The type of alignment layer used is as such not critical provided the necessary wettability conditions are satisfied. Any conventional alignment means, rubbed, photo-aligned or otherwise, may be used including in particular a polyvinylalcohol alignment layer or a polyimide layer. The alignment layer may also be used means to achieve a differential wetting of the liquid and polymeric/polymerizable material with respect to the substrate and thus bring about a well-defined stratification.

Combining a composite in accordance with the invention with a substrate during use and/or manufacture at least confines the liquid in directions normal to the liquid layer. In order to prevent liquid from leaking away from the composite, the composite may be packaged. Alternatively, by providing the substrate with a recess or with ridges an enclosure adapted to contain phase-separable material may be formed. After phase-separation, the polymeric layer caps the enclosure and its perimeter is attached to the side-walls of the enclosure thus obtaining a liquid tight container. The enclosure may be formed in any convenient manner for example, in the case of a plastic substrate, by injection molding. In a particular embodiment, ridges forming an enclosure may be obtained from the photo-polymerizable phase-separable material by pattern-wise photo-polymerization, eg by means of a mask having a pattern outlining the ridges to be formed.

In order to improve the mechanical integrity and stability of the stratified-phase-separated composite and/or maintain a well-defined liquid crystal layer thickness, the liquid crystal layer may comprise and/or may be partitioned by connecting (supporting) members which connect the substrate to the polymeric layer. Thus, the thickness of the connecting members exceeds the thickness of the liquid crystal layer. The connecting members may be conventional spacers which are partially embedded in the polymeric layer, or a relief structure pattern photo-lithographically provided on the substrate before the stratified-phase-separated composite is formed using for example a photo-resist. In a very advantageous embodiment, the connecting members are formed by pattern-wise photo-polymerizing photo-polymerizable stratified-phase-separable composition, e.g. by means of a mask. The pattern-wise photo-polymerization is conveniently performed before or simultaneous to the flood-exposure required to form the phase-separated polymeric and liquid layer.

The composite in accordance with the invention may be used for a variety of applications. In its broadest sense it may be used for any application involving a liquid. A general application if combined with a substrate, is a liquid-tight packaged liquid for containing thin (about 0.1 μm to about 1 mm) films of liquid of large surface area (about 1 cm$^2$ to about 1 m$^2$ or more). The composites in accordance with the invention allow such liquid-filled packages to be formed quickly and in an easy manner. Filling large area thin containers with liquid in the traditional manner is cumbersome. If the liquid is selected to be polymerizable, the composite in accordance with the invention may also be used for solid-state applications.

An important class of applications are optical and electro-optical applications in particular when the liquid is liquid crystal. In particular if photo-polymerization is performed pattern-wise, microlens arrays, gratings and structures can be manufactured.

In a preferred embodiment, the invention relates to a display device comprising a composite in accordance with the invention.

The composite in accordance with the invention may comprise a liquid crystal layer which is switchable between a first and second state, the first and second state having different optical properties such as a difference in polarization selectivity. Thus, the composite in accordance with the invention may be used in a LC display device. In principle, there is no limitation on the LC effect and device. However in a preferred embodiment an in-plane switching arrangement is used because the required electrodes may all be formed on the substrate used to support the stratified-phaseseparated composite. As the composites may be manufactured in a continuous process rather than a batch process the composites may be of particular advantage in roll-to-roll manufactured displays.

The invention also relates to a method of manufacturing a stratified-phase-separated composite in accordance with the invention. In a first embodiment, the method comprises:

providing a supporting substrate; applying, on the substrate, a layer of crosslinkable, stratified-phase-separable composition comprising a crosslinkable material and a liquid;

crosslinking the layer of crosslinkable, stratified-phase-separable composition thus formed to induce phase-separation into a stratified phase-separated composite comprising a liquid layer and a crosslinked polymeric layer.

In a broad sense, the method of this embodiment, which may also be referred to as a single substrate method, provides an alternative method of forming a packaged liquid layer. The method is of particular use in case the liquid layer to be packaged is thin, say about 0.1 $\mu$m to 1 mm, is of large surface area, typically form about 0.1 cm$^2$ to about 1 m$^2$ or more and/or has to have a uniform well-defined thickness to be kept constant during use of the packaged liquid layer. Packaging thin and large area liquid layers by filling a thin and large area container with liquid is cumbersome. The method in accordance with this embodiment is suitable for a bottom-up process in which layers are stacked on top of the other. The method may in particular be combined with the provision of further layers by wet deposition methods such as coating and printing methods. The method may be performed in a batch process but also in a continuous process, in particular the method may be used in a roll-to-roll manufacturing process thus allowing cost-effective mass-production.

In a preferred embodiment of the single substrate method, the crosslinkable, stratified-phase-separable composition is photo-polymerizable (photo-crosslinkable) and contains a photo-polymerization dye which selectively accumulates in the polymeric layer being formed. (Meth)acrylate monomers are preferred monomers for use in the single substrate manner.

A plurality of single substrate composites obtainable from the single method may be stacked to form a stack of single substrate stratified-phase-separated composites. Such a stack of composites may, for example, be used to obtain a multi or even full color display in which the active LC layers are stacked one on top the other to gain a factor of three in active display area. By using a single substrate to form a stacked display instead of a double substrate the distance between the active layers can be reduced to twice the thickness of the polymeric layer which may as low as 5 to 10 $\mu$m. In this way parallax effects prominent in conventional stacked displays are significantly reduced.

In one embodiment, the single substrate method is repeated a number of times in succession where the single substrate stack of a previous time is used as the single substrate for a next single substrate step. Alternatively, two single substrate composites may be prepared separately and then attached to each via their polymeric layers. In this embodiment, the electrodes may be provided on both single substrates to form a single sandwich electrode arrangement or each substrate may be provided with in-plane switching electrodes to render both liquid layers (independently) switchable.

Another embodiment of the method in accordance with the invention comprises:

providing a cell adapted to contain a layer of a crosslinkable, stratified-phase-separable composition;

filling the cell with crosslinkable, stratified-phase-separable composition comprising a crosslinkable material and a liquid layer;

crosslinking the layer of crosslinkable, stratified-phase-separable composition thus formed to induce phase-separation into a stratified phase-separated composite comprising a liquid layer and a crosslinked polymeric layer.

This method, also referred to as the double substrate method, may be useful for example when very thin polymer layers are to be manufactured. Such a thin polymeric layer may be desirable if the composite forms part of an LC cell in which the liquid layer of the composite is the active LC layer. In case the LC layer is to be rendered switchable by sandwiching the composite between two opposed substrates each provided with electrodes, the polymeric layer is preferably thin to reduce capacitance.

Further details regarding the single and double substrate method with respect to phase-separation, stratification and cross-linking have been described hereinabove.

These and other aspects of the invention will be apparent from and elucidated with reference to the examples described hereinafter.

In the drawings:

The sole FIGURE shows, schematically, in a cross-sectional view, a cell comprising a stratified phase-separated composite in accordance with the invention.

EXAMPLE 1

A stratified-phase-separated composite in accordance with the invention is manufactured using a method in accordance with the invention as follows:

A stratified-phase-separable composition is prepared having the following composition:

50.0 wt % liquid crystal E7,
44.5 wt % photo-polymerizable isobornylmethacrylate (formula A1),
0.5 wt % photo-initiator (formula A2), and
5.0 wt % of hexanedioldimethacrylate, acronymed HDODMA (formula A6)

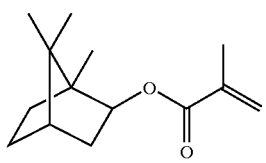

A1

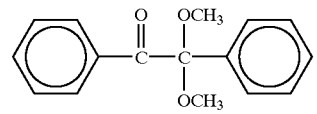

A2

-continued

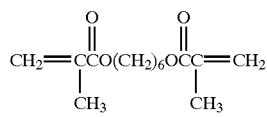

A3

Liquid crystal E7 is marketed by Merck and comprises a mixture of cyanobiphenyls and cyanoterphenyls. The photo-initiator A2 is marketed under the trade name Irgacure 651 by Ciba Geigy. The dimethacrylate HDODMA can be purchased from Aldrich.

The liquid crystal E7 has a significant absorption in the range of 300 to 350 nm. The photo-initiator used to initiate the photo-polymerization also absorbs in this wavelength range, so the liquid crystal E7 is a photo-polymerization dye, that is a dye which absorbs at least partially the radiation used to photo-polymerize.

Being a monomethacrylate, the monomer A1 is (photo)-polymerizable but not crosslinkable.

Being a dimethacrylate, a monomer having functionality 4, hence capable of reacting with four other monomers, the HDODMA monomer A6 is photo-polymerizable and crosslinkable. The monomer A6 does not absorb in the wavelength range 300 nm to 350 nm used to photo-polymerize.

The stratified-phase-separated composite obtained by photo-polymerizing this stratified-phase-separable composition comprises a crosslinked polymer. The crosslink density, expressed in terms of the number of crosslinks in moles per 1000 g of polymer, assuming all dimethacrylate monomers have fully reacted, is $1000*((5/(44.5+5)/M_{A6})*(4-2))$ with $M_{A6}=254$, the molecular weight of A6, the crosslink density is 0.8.

The sole FIGURE shows, schematically, in a cross-sectional view, a cell comprising a stratified phase-separated composite in accordance with the invention.

A transparent cell 41, also referred to as a double substrate cell, is made by positioning two glass substrates 42 and 43, the substrate 42 carrying a rubbed polyimide alignment layer 48 (AL1051 of JSR) opposite one another at a distance of 7 μm by means of spacers and subsequently gluing the substrates 42 and 43 together along the edges leaving a small opening for filling. The cell thus made is filled, at 50° C., by capillary action with a quantity of the stratified-phase-separable composition. The filled cell is, with the substrate 43 being arranged closest to a UV radiation source (Philips TL-08, 0.1 mW/cm2), exposed to UV-light for 60 minutes at a temperature of 50° C. and then cooled down to room temperature. During exposure, due to the absorption in the layer of phase-separable composition, a light intensity gradient for wavelengths of 300–350 nm and normal to the substrates is established. The light intensity in the layer being highest at the side closest to the UV source, polymerization and cross-linking selectively occurs nearest to the substrate 43. The (partially) polymerized monomers formed by the UV exposure are not miscible with the liquid crystal material E7 and thus phase separates from the liquid crystal material. Under the influence of the light intensity gradient set up by the blanket exposure, the phase separation proceeds in a stratified manner to form a stratum of crosslinked polymer on top of a stratum of liquid crystal E7, the liquid crystal stratum being formed closest to the substrate 42. Monomeric material is selectively depleted nearest to the substrate 43, more in particular at the interface of the liquid crystal layer and polymer layer being formed, as a result of which a diffusion gradient in monomer A1 and A6 concentration is set up as a result of which monomer is continuously fed to the liquid crystal layer/polymer layer interface which allows the stratification process to proceed further. In the early stages of the stratification when the polymer formed comprises no to very few crosslinks, the polymeric layer being formed substantially extends across the entire thickness of the layer. Upon further polymerization, the the number of crosslinks increases, the polymer network becomes more dense and the polymeric layer contracts to form a thinner layer nearest the substrate 43. Because of the contraction liquid crystal molecules which are still present in the polymeric layer being formed are effectively squeezed out. Finally, the photo-polymerization induced phase separation produces a double substrate cell comprising a stratified-phase-separated composite 47 comprising a crosslinked polymeric layer 46 and a liquid crystal layer 44 of E7.

From a stratified-phase-separated composite in accordance with the invention thus manufactured, the liquid crystal material is recovered and its clearing temperature is measured. The measured clearing temperature is the same as that of virgin liquid crystal E7, which demonstrates that the liquid crystal layer 44 of the stratified phase-separated composite 47 essentially consists of liquid crystal E7.

Visual inspection using the unaided eye shows that the stratified-phase-separated composite does not scatter light in reflection or in transmission.

When a double substrate cell comprising stratified composite thus manufactured is examined under a polarization microscope equipped with crossed polarizers, the liquid crystal layer 44 of the composite 47 is found to be birefringent. In particular, with the stratified-phase-separated composite arranged between two crossed polarizers and aligned such that the rubbing direction of the polyimide layer 48 makes an angle of 45° with the polar axis of each of the two polars, the cell appears bright if illuminated from behind, whereas if the rubbing direction is aligned with the polar axis of one of the polarizers the cell appears dark, indicating that the liquid crystal layer LC molecules have a more or less uniaxial alignment. Under 45° the cell presents a relatively homogeneously bright image. No dark spots are observed. Dark spots occur at locations where non-birefringent material is present. In particular, because the crosslinked polymer is not birefringent, it is thus ascertained that the polymeric layer does not have polymeric protrusions which extend from the polymeric layer all the way across the thickness of the liquid crystal layer.

In order to assess the extent to which the stratified-phase-separation has occurred, in particular to assess the amount of liquid crystal material present in the crosslinked polymeric layer, the retardation (dΔn) of the stratified-phase-separated composite is measured. Since the crosslinked polymer is not birefringent and any liquid crystal molecules which may be present in the crosslinked polymeric layer are not oriented on a macroscopic scale, the measured birefringence is expected to equal dΔn, where d is the thickness of the liquid crystal layer 44 and Δn is the birefringence of the liquid crystal layer 44 at unit thickness. The retardation is measured to be 136 nm.

COMPARATIVE EXAMPLE 1 (NOT IN ACCORDANCE WITH THE INVENTION)

Example 1 is repeated with the difference that the amount of crosslinkable monomer A6 is replaced with non-crosslinkable monomer A1. In particular the composition used in this example is:

50 wt % liquid crystal E7,
49.5 wt % photo-polymerizable isobornylmethacrylate (formula A1),
0.5 wt % photo-initiator (formula A2), This composition has no monomers having a functionality of more than 2, is therefore not crosslinkable. The crosslink density is 0.0.

Polymerizing a layer of this composition formed in a double substrate cell as shown in FIG. 1, results in a stratified-phase-separated composite comprising a liquid layer and a polymeric layer, both the liquid layer and polymeric layer being continuous. Since the polymeric layer is not crosslinked, the composite is not in accordance with the invention.

The clearing temperature of E7 liquid crystal removed from the composite is the same as that of virgin E7 liquid crystal indicating that the liquid crystal layer substantially consists of liquid crystal material.

Examination of the composite arranged between crossed polarizers under a polarization microscope as described in detail in example 1 shows the liquid crystal layer to be uniaxially aligned.

Visual inspection using the unaided eye shows some scattering of light indicating that the liquid layer/polymeric layer interface is less smooth than in the composite in accordance with the invention of Example 1.

The retardation dΔn is measured to be 62 mn.

Comparing this retardation with the retardation of Example 1, 136 nm, the retardation of this Comparative example 1 is significantly lower. Assuming Δn is at least not smaller, this indicates that the liquid layer of Example 1 is thicker than in this Comparative example 1. Since the amount of liquid crystal used in both examples is the same, the thicker LC layer means that less liquid crystal molecules are present in the crosslinked polymeric layer.

Example 1 and Comparative example 1 together demonstrate that the phase separation is more complete, in the sense that less liquid crystal molecules are present in the polymeric layer, if the polymeric layer is crosslinked.

EXAMPLE 2

Example 1 is repeated with the difference that a stratified-phase-separable composition is prepared having the following composition:

50.0 wt % liquid crystal E7,
43.5 wt % photo-polymerizable isobornylmethacrylate (formula A1),
0.5 wt % photo-initiator (formula A2),
5.0 wt % photo-polymerizable stilbene monoacrylate dye (formula A5), and
1.0 wt % of hexanedioldimethacrylate, acronymed HDODMA (formula A6)

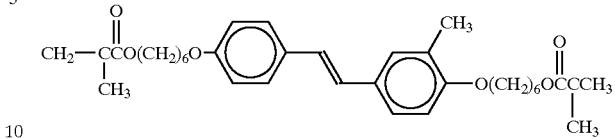

The dye A5 absorbs in the wavelength range being used to photo-polymerize the stratified-phase-separable composition and the molecular weight of the monomethacrylate A5 ($M_{A5}$) is 363.

The crosslink density, expressed in terms of the number of crosslinks in moles per 1000 g of polymer, assuming all dimethacrylate monomers have fully reacted, is $1000*((1/49.5)/254)(4-2)=0.16$.

The degree of crosslinking, expressed as the molar ratio of cross-linkable monomer to non-crosslinkable monomer, is 1:47.

The composition thus prepared is processed into a cell comprising a stratified-phase-separated composite in accordance with the invention in the manner described in Example 1.

From a stratified-phase-separated composite in accordance with the invention thus manufactured, the liquid crystal material is recovered and its clearing temperature is measured. The measured clearing temperature is the same as that of virgin liquid crystal E7, which demonstrates that the liquid crystal layer 44 of the stratified phase-separated composite 47 essentially consists of liquid crystal E7.

Visual inspection using the unaided eye shows that the stratified-phase-separated composite does not scatter light in reflection transmission.

When a double substrate cell comprising stratified composite thus manufactured is examined under a polarization microscope equipped with crossed polarizers, the liquid crystal layer 44 of the composite 47 is found to be birefringent.

In particular, with the stratified-phase-separated composite arranged between two crossed polarizers and aligned such that the rubbing direction of the polyimide layer 48 makes an angle of 45° with the polar axis of each of the two polars, the cell appears bright if illuminated from behind whereas if the rubbing direction is aligned with the polar axis of one of the polarizers the cell appears dark, indicating that the liquid crystal layer LC molecules have a more or less uniaxial alignment. Under 45° the cell presents a relatively homogeneously bright image. No dark spots are observed. Dark spots occur at locations where non-birefringent material is present. In particular, it is thus ascertained that the polymeric layer does not have polymeric protrusions which extend from the polymeric layer all the way across the thickness of the liquid crystal layer.

The retardation of the stratified-phase-separated composite is measured to be 94 nm. This number is not necessarily directly comparable to the retardation of the previous examples as the birefringence Δn may be different due to a slightly different orientation.

EXAMPLE 3

Example 2 is repeated except that the amount of cross-linkable monomer A6 is increased at the expense of non-crosslinkable monomer A1.

Specifically the stratified-phase-separable composition is:

50.0 wt % liquid crystal E7,
37.0 wt % photo-polymerizable isobomylmethacrylate (formula A1),
0.5 wt % photo-initiator (formula A2),
5.0 wt % photo-polymerizable stilbene monoacrylate dye (formula A5), and
7.5 wt % of hexanedioldimethacrylate, acronymed HDODMA (formula A6)

The crosslink density, expressed in terms of the number of crosslinks in moles per 1000 g of polymer, assuming all dimethacrylate monomers have fully reacted, is $1000*((7.5/49.5)/254)(4-2)=1.19$.

The molar degree of crosslinking, expressed as the molar ratio of cross-linkable monomer to non-crosslinkable monomer, is $(7.5/254):(37/223 +5/363)=1:6.08$.

The stratified-phase-separated composite obtained from this composition by manufacturing a cell as in example 2 has similar properties as the composite of example 2. The retardation however is measured to be 187 nm.

Comparing the retardation of this Example 3, 187 nm, to that of Example 2, 94 nm, shows that the extent of stratification, in the sense of the amount of liquid crystal being trapped in the crosslinked polymeric layer, depends on the crosslink density. In particular, the stratification is more complete if the crosslink density is increased.

What is claimed is:

1. A stratified-phase-separated composite comprising a crosslinked polymeric layer and a continuous liquid layer separate from the crosslinked polymeric layer, the composite being obtainable by crosslinking a layer of a crosslinkable, stratified-phase-separable composition comprising a crosslinkable material and a liquid.

2. A composite as claimed in claim 1, wherein the polymeric layer of the composite has a crosslink density, expressed as the number of crosslinks in motes per 1000 g of polymer, is in the range from 0.15 to 2.5.

3. A composite as claimed in claim 1, wherein the liquid is a liquid crystal.

4. A display device comprising a composite as claimed in claim 1.

5. A method of manufacturing a stratified-phase-separated composite comprising a crosslinked polymeric layer and a continuous liquid layer separate from the crosslinked polymeric layer, the method comprising:

providing a supporting substrate;

applying, on the substrate, a layer of crosslinkable, stratified-phase-separable composition comprising a crosslinkable material and a liquid;

crosslinking the layer of crosslinkable, stratified-phase-separable composition thus formed to induce phase-separation into a stratified phase-separated composite comprising a crosslinked polymeric layer and a continuous liquid layer separate from the crosslinked polymeric layer.

6. A method of manufacturing a stratified phase-separated composite comprising a crosslinked polymeric layer and a continuous liquid layer separate from the crosslinked polymeric layer, the method comprising:

providing a cell adapted to contain a layer of a crosslinkable, stratified-phase-separable composition;

filling the cell with crosslinkable, stratified-phase-separable composition comprising a crosslinkable material and a liquid;

crosslinking the layer of crosslinkable, stratified-phase-separable composition thus formed to induce phase-separation into a stratified phase-separated composite comprising a crosslinked polymeric layer and a continuous liquid layer separate from the crosslinked polymeric layer.

* * * * *